(12) United States Patent
Honegger

(10) Patent No.: US 8,281,668 B2
(45) Date of Patent: Oct. 9, 2012

(54) BRACE BAR WITH A PARTIAL BOND

(75) Inventor: Allen Honegger, Berthoud, CO (US)

(73) Assignee: Micro Motion, Inc., Boulder, CO (US)

( * ) Notice: Subject to any disclaimer, the term of this patent is extended or adjusted under 35 U.S.C. 154(b) by 115 days.

(21) Appl. No.: 12/934,091

(22) PCT Filed: Apr. 2, 2008

(86) PCT No.: PCT/US2008/059101
§ 371 (c)(1),
(2), (4) Date: Sep. 23, 2010

(87) PCT Pub. No.: WO2009/123632
PCT Pub. Date: Oct. 8, 2009

(65) Prior Publication Data
US 2011/0016987 A1 Jan. 27, 2011

(51) Int. Cl.
*G01F 1/84* (2006.01)

(52) U.S. Cl. .................................................. 73/861.355

(58) Field of Classification Search ............. 73/861.355, 73/861.356, 861.357
See application file for complete search history.

(56) References Cited

U.S. PATENT DOCUMENTS

| | | | | | |
|---|---|---|---|---|---|
| 5,344,717 | A | * | 9/1994 | Dutton et al. | 428/598 |
| 5,370,002 | A | * | 12/1994 | Normen et al. | 73/861.355 |
| 6,415,668 | B1 | * | 7/2002 | Cage | 73/861.355 |
| 6,487,917 | B1 | * | 12/2002 | Van Cleve et al. | 73/861.357 |

FOREIGN PATENT DOCUMENTS

EP 0848235 A2 6/1998

* cited by examiner

*Primary Examiner* — Jewel V Thompson
(74) *Attorney, Agent, or Firm* — The Ollila Law Group LLC

(57) ABSTRACT

A partially bonded brace bar assembly is provided according to an embodiment of the invention. A vibrating element adapted to vibrate about a bending axis (W, W') is provided. The vibrating element has a high stress region (412). A brace bar (201 204) is bonded to the vibrating element using a partial bond (420). The partial bond (420) is formed only in the high stress region (412).

14 Claims, 7 Drawing Sheets

BRACE BAR WITH A PARTIAL BOND

TECHNICAL FIELD

The present invention relates to a brace bar, and more particularly, to a brace bar partially welded to a vibrating element, such as a flow tube.

BACKGROUND OF THE INVENTION

There are various methods for bonding two structural elements together including, but not limited to brazing, welding, adhesives, etc. Typically brazing involves applying a brazing material to the surfaces of one or both of the elements that are to be joined together. The elements then undergo a high temperature brazing process that melts the brazing material. If the elements are contacting one another, as the brazing material cools, the elements become substantially permanently coupled to one another. Welding typically involves melting the surfaces of one or both elements that are to be joined as well as a filler material. This creates a pool of molten material. As the molten material cools, a strong joint is formed. Adhesives typically are applied to one or both of the structural elements and as the adhesive cures, it forms a bond between the two elements, either chemical, electrostatic, or in some instances using Van der Waals forces.

All of these methods of bonding have inherent problems of subjecting the structural elements to various stresses both during the process and while the material cools to form the bond. In applications where the elements are not subject to movement or vibrations, these stresses typically go unnoticed. However, the additional stresses caused can create unwanted side effects if the elements are under consistent movement or vibration.

The flow meter industry, and in particular, the Coriolis flow meter industry faces a unique challenge in bonding elements together. For example, most flow meters include one or more flow conduits that are connected inline in a pipeline or other transport system to convey material, e.g., fluids, slurries and the like, in the system. Each conduit may be viewed as having a set of natural vibration modes including for example, simple bending, torsional, radial, and coupled modes. In a typical Coriolis mass flow measurement application, a conduit is excited in one or more vibration modes as a material flows through the conduit, and the motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring the time delay or phase differences between motion at the transducer locations. Typically, the flow meter will also include one or more brace bars, which can define a bending axis of the flow conduit. Typically, these brace bars are bonded to the flow conduit using a brazing, welding, or adhesion process. In most cases, the bonding process creates additional stresses in the flow conduit. Because the flow conduits are excited in one or more vibration modes, even relatively small stresses can significantly affect the meter's performance. Additionally, these bonding processes can be expensive and time consuming.

Therefore, there is a need to provide a method for reducing the stresses caused by bonding (brazing, welding, adhesives, etc.). Additionally, there is a need to provide a method for reducing the cost and time consumed in bonding elements together, and in particular, for bonding a brace bar to a flow conduit. The present invention overcomes these and other problems and an advance in the art is achieved.

ASPECTS

According to one aspect of the invention, a partially bonded brace bar assembly, comprises:
  a vibrating element adapted to be vibrated about a bending axis and having a high stress region; and
  a brace bar bonded to the vibrating element with a partial bond formed only in the high stress region.

Preferably, the partial bond extends over the entire high stress region.

Preferably, the partial bond is located on only a top side of the brace bar.

Preferably, the partial bond is located on only a bottom side of the brace bar.

Preferably, the partial bond is located on both a top side and a bottom side of the brace bar.

Preferably, the vibrating element comprises a flow tube.

Preferably, the brace bar further comprises a cut-out region formed in a portion of the brace bar aligned with a low stress region of the vibrating element.

According to another aspect of the invention, a method for partially bonding a brace bar to a vibrating element adapted to be vibrated about a bending axis and having a high stress region, the method comprises the steps of:
  positioning the vibrating element within the brace bar; and
  bonding the brace bar to the vibrating element using a partial bond formed only in the high stress region.

Preferably, the method further comprises the step of forming the partial bond through the entire high stress region.

Preferably, the method further comprises the step of partially bonding only a top side of the brace bar.

Preferably, the method of further comprises the step of partially bonding only a bottom side of the brace bar.

Preferably, the method further comprises the step of partially bonding both a top side and a bottom side of the brace bar.

Preferably, the method the vibrating element comprises a flow tube.

Preferably, the method further comprises the step of forming a cut-out region in a portion of the brace bar that is aligned with a low stress region of the vibrating element.

DETAILED DESCRIPTION OF THE INVENTION

FIGS. 1-7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
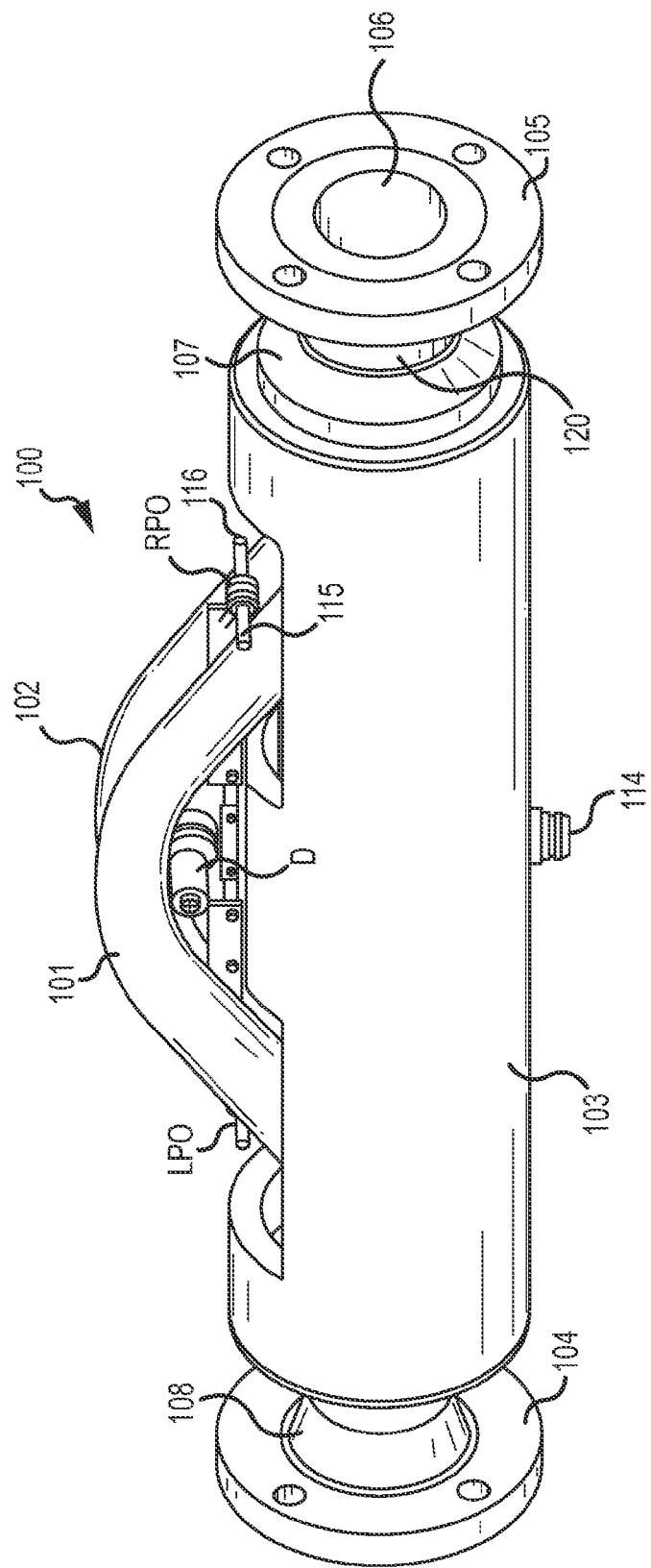
FIG. 1 shows a flow meter according to an embodiment of the invention.

FIG. 1 shows a flow meter 100 according to an embodiment of the invention. According to one embodiment of the invention, the flow meter 100 comprises a Coriolis flow meter. However, the present invention is not limited to applications incorporating Coriolis flow meters, and it should be understood that the present invention could be used with other types of flow meters. Additionally, the present invention can be used in applications other than flow meters where the structural elements bonded together may be subjected to vibrations or other movements. The flow meter 100 comprises a spacer 103 enclosing the lower portion of the flow tubes 101, 102 which are internally connected on their left ends to flange 104 via its neck 108 and which are connected on their right ends via neck 120 to flange 105, and manifold 107. Also shown in FIG. 1 are the outlet 106 of flange 105, left pick-off LPO, right pick-off RPO and driver D. The right pick-off RPO is shown in some detail and includes magnet structure 115 and coil structure 116. Element 114 on the bottom of manifold spacer 103 is an opening for receiving from meter electronics (not shown) a wire (not shown) that extends internally to driver D and pick-offs LPO and RPO. Flow meter 100 is adapted when in use to be connected via flanges 104 and 105 to a pipeline or the like.

Figure 2:
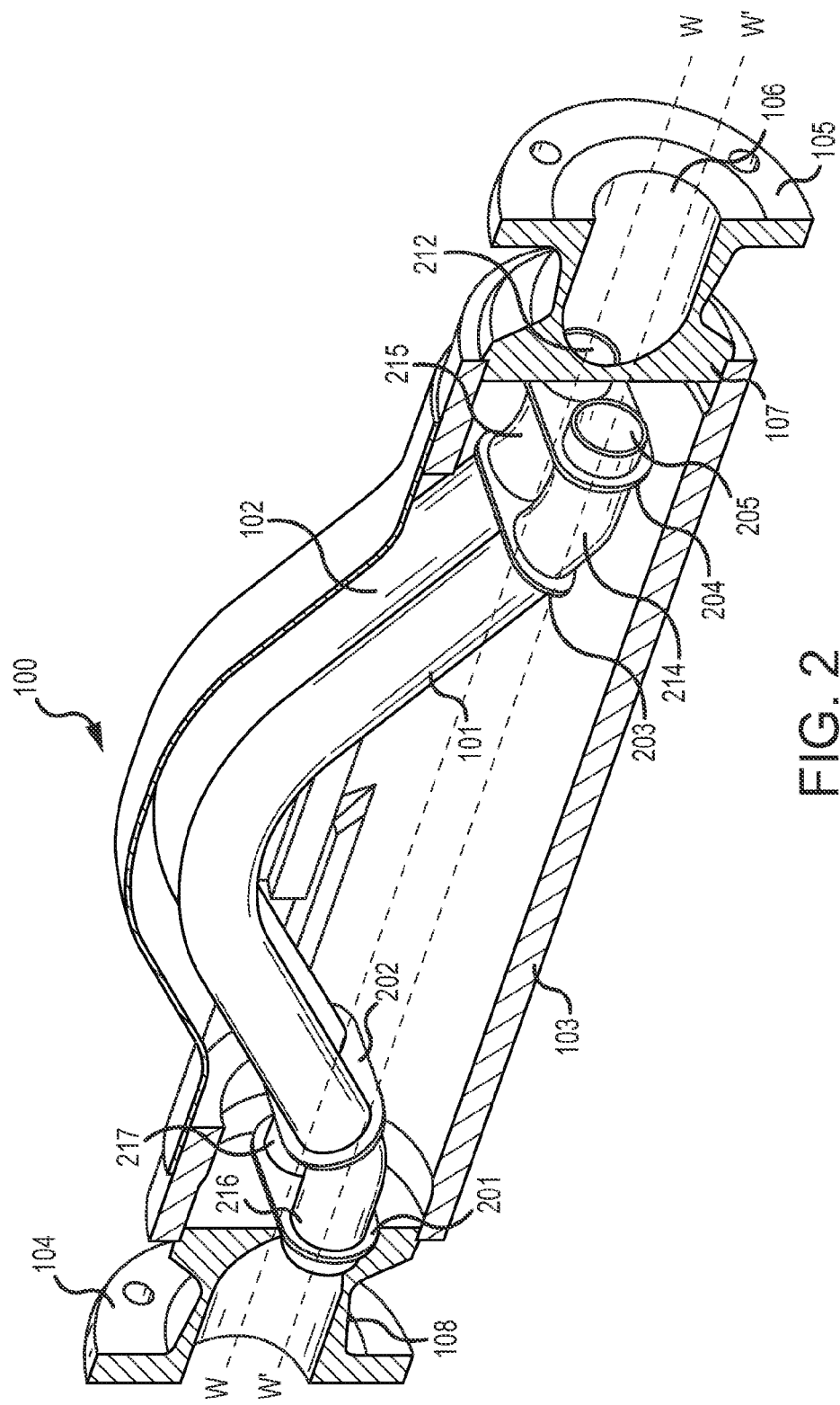
FIG. 2 shows a cut away view of the flow meter.

FIG. 2 shows a cut away view of flow meter 100. This view removes the front portion of manifold spacer 103 so that parts internal to the manifold spacer may be shown. The parts that are shown on FIG. 2, but not on FIG. 1, include outer end brace bars 201 and 204, inner brace bars 202 and 203, right end flow tube outlet openings 205 and 212, flow tubes 101 and 102, curved flow tube sections 214, 215, 216, and 217. In use, flow tubes 101 and 102 vibrate about their bending axes W and W'. The outer end brace bars 201 and 204 and the inner brace bars 202 and 203 help determine the location of bending axes W and W'.

Figure 3:
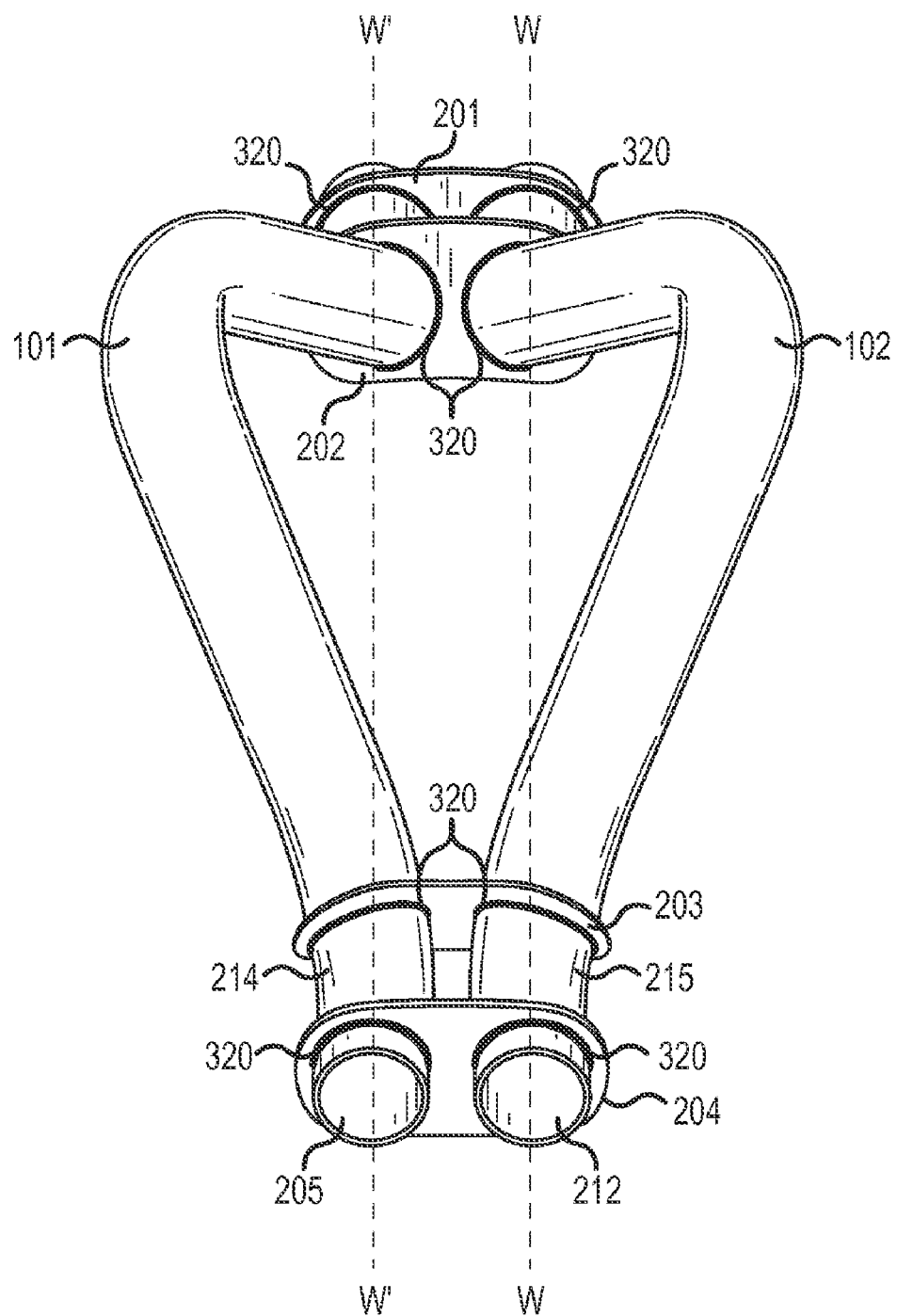
FIG. 3 shows an end view of the flow tubes with the brace bars bonded according to the prior art.

FIG. 3 shows an end view of the flow tubes 101 and 102 which are shown as being outwardly deflected from each other under the influence of driver D (which is not shown in FIG. 3). Inner brace bars 202 and 203 as well as outer brace bars 201 and 204 together with outlet opening 205 and 212 are also shown in FIG. 3. The portrayal of the outward deflection of flow tubes 101, 102 is shown exaggerated to facilitate an understanding of its operation. In use, the deflections of the flow tubes by the driver D are so small in magnitude so as to be undetectable by the human eye.

The brace bars 201-204 are shown according to the prior art. As can be seen, the brace bars 201-204 are bonded substantially completely around the outer surface of the flow tubes 101, 102. The bond 320 is shown as the shaded portion at the brace bar/flow tube interface. For each brace bar 201-204, the bond 320 substantially surrounds the flow tube 101, 102. Not only does this prior art approach to bonding the brace bar 201-204 to the flow tube 101, 102 use an excess of bonding material, but also uses an excess of time in coupling the brace bar 201-204 to the flow tube 101, 102. The reasoning is that the flow tubes 101, 102 bend around a neutral axis W, W' driven by driver D. This neutral axes W, W' create a point of low stress in the flow tube 101, 102 during vibration. Therefore, not only is bonding along the bending axes W, W' unnecessary, but the process can also result in a shorter tube life because of the added stresses created by a bond 320.

Figure 4:
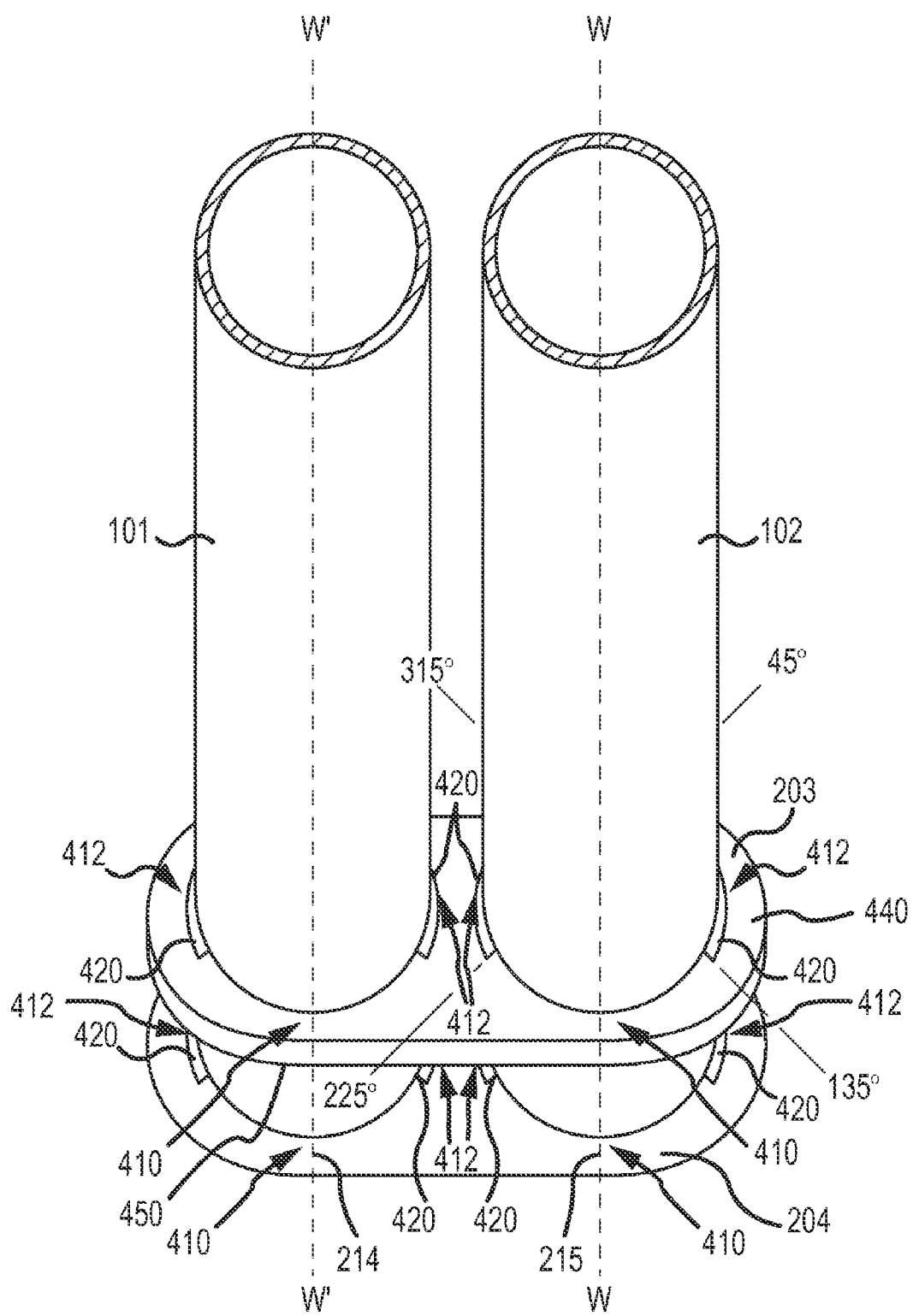
FIG. 4 shows a cross section view of the flow tubes with the brace bars bonded according to an embodiment of the invention.

FIG. 4 shows a brace bar bonded according to an embodiment of the invention. FIG. 4 shows a cross section view of the flow tubes 101 and 102 taken about their longitudinal axial mid-portion. Although the discussion below relates to flow tubes 101, 102, it should be understood that in other embodiments, the brace bar is bonded to a vibrating element to form a brace bar assembly. Therefore, the present invention should not be limited to a flow tube assembly comprising the brace bar and a flow tube, but instead is applicable to other applications that include a vibrating element.

As shown in FIG. 4, the flow tubes 101, 102 are positioned within one or more brace bars (201-204) and vibrate about a bending axis W' and W respectively. The bending axes W', W are defined in part by the brace bars 201-204 (only brace bars 203, 204 are shown in FIG. 4). According to an embodiment of the invention, the brace bars 201-204 are bonded to the flow tubes 101, 102 using partial bonds 420. As can be seen, unlike the prior art, the partial bonds 420 do not extend around the full circumference of the flow tubes 101, 102. In contrast, the partial bonds 420 are positioned only in the high stress regions 412. The high stress regions 412 are defined further below with reference to FIG. 5. According to an embodiment of the present invention, the brace bars 201-204 are not bonded in the low stress regions 410.

Each brace bar 201-204 comprises a top 440 and a bottom 450. According to an embodiment of the invention, the partial bond 420 is located only on the top 440 of the brace bar. According to another embodiment of the invention, the partial bond 420 is located only on the bottom 450 of the brace bar. According to yet another embodiment of the invention, a partial bond 420 is located on both the top 440 and the bottom 450 of the brace bar. In some embodiments where a partial bond 420 is located only on one side of the brace bar, the other side may contain a full bond according to the prior art. Because of the bending axes W, W', the present invention may employ a partial bond 420 without sacrificing the functionality or life of the brace bar. With reference to both FIG. 4 and FIG. 5, the stress experienced during vibration is better explained.

Figure 5:
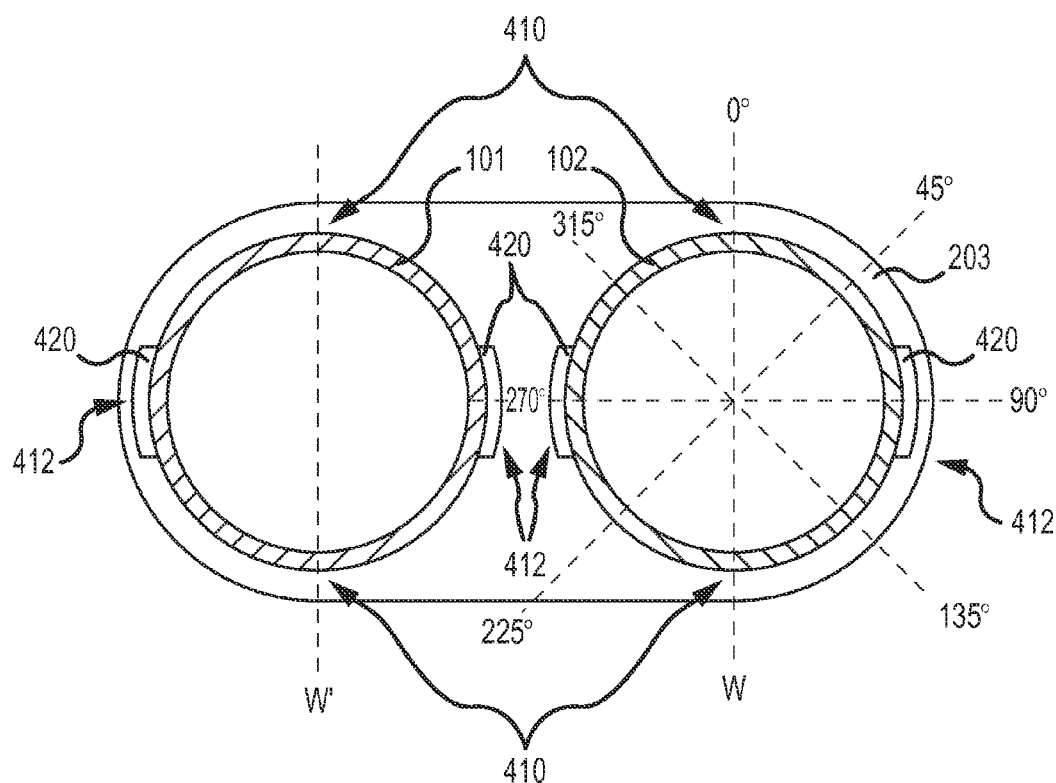
FIG. 5 shows a partially bonded brace bar according to an embodiment of the invention.

FIG. 5 shows a cross section view of the flow tubes 101, 102 looking straight down on the brace bar 203 according to an embodiment of the invention. It should be understood that the discussion is equally applicable to any of the brace bars and is not limited to brace bar 203. As the flow tubes 101, 102 bend about their bending axes, W' and W respectively, the stress experienced at the flow tube/brace bar interface varies around the circumference of the flow tube. For example, a high stress region 412 experiences the greatest stress because of the cyclic loading experienced in this region during tube vibration. In contrast, a low stress region 410 experiences little stress during tube vibration.

It is important to understand how to define the high stress region 412. The discussion below is limited to the flow tube 102, however, it should be appreciated that description of the high stress region 412 is identical in the flow tube 101. Furthermore, a high stress region 412 can also be seen in other vibrating elements that are adapted to bend about a bending axis similar to bending axes W, W'.

Looking at FIG. 5, a reference point is positioned in the center of the circumference of the flow tube 102 with 0° being straight up on the bending axis W as shown in FIG. 5. It should be understood that the reference coordinates chosen is merely to aid in the understanding of the present invention and other reference systems may be chosen. Therefore, the present invention is not limited to the chosen coordinate system. As described above, as the flow tube 102 vibrates about its bending axis W, the flow tube 102 experiences a greater stress in the high stress region 412. According to an embodiment of the invention, the high stress region 412 is defined as the area of the flow tube 102 from approximately 45° to approximately 135°. Because the flow tube experiences the same stress on both sides of the bending axis W, the high stress region 412 also extends from approximately 225° to approximately 315°. The high stress region 412 experiences the greatest stress during vibration, with the maximum stress experienced at approximately 90° and 270°.

In contrast, the area extending from approximately 0° to approximately 45° and approximately 135° to approximately 225° and approximately 315° to approximately 0° experiences little stress during vibration. These areas are designated low stress regions 410. In many applications, including Coriolis flow meter applications, bonding the brace bar to the vibrating element, such as flow tube 101, 102 in the low stress region 410 is not needed and adds little value; however, it can have negative effects because as the bond is formed, it adds stress due to heating and cooling, for example. Therefore, it is undesirable to provide a bond in the low stress region 410. On the other hand, because the maximum stress is realized in the high stress region 412, it is important to provide a bond, such as bond 420, within this area. It should be understood that providing a bond 420 in the high stress region 412, includes a bond 420 on both sides of the bending axis, i.e., the high stress region 412 between approximately 45° and 135° and the high stress region between approximately 225° and 315°.

According to an embodiment of the invention, the brace bars 201-204 are bonded to the vibrating element, such as a flow tube 101, 102 using a partial bond 420. The partial bond 420 is formed only in the high stress region 412. According to one embodiment of the invention, the partial bond 420 extends over the entire high stress region 412 (See FIGS. 4 & 6). However, as shown in FIG. 5, the partial bond 420 in other embodiments only extends over a portion of the high stress region 412. According to an embodiment of the invention, the partial bond 420 is centered on 90° and 270° where the stress caused experienced by the vibrating flow tube driven by driver D are at a maximum. The particular application will determine what portion of the high stress region 412 of the vibrating element needs to be bonded to the brace bar. For example, a greater stress experienced in the high stress region 412, requires a greater portion of the high stress region 412 to be bonded to the brace bar.

Returning to FIG. 4, the brace bar/flow tube interface only includes bonds 420 in the high stress region 412. Similarly, it should be noted that there is not a bond provided in the low stress region 410. By bonding the brace bars 201-204 to the flow tubes 101, 102 in only the high stress region 412, the process is much faster than the prior art, which requires a bond substantially completely around the entire flow tube 101, 102. Additionally, the present invention provides a process that saves money by requiring less bonding material.

It should be appreciated that although the present invention provides less bonded surface area, the partial bond is sufficient to retain the brace bars 201-204 in position on the flow tubes 101, 102 because of the neutral bending axes W, W'.

Figure 6:
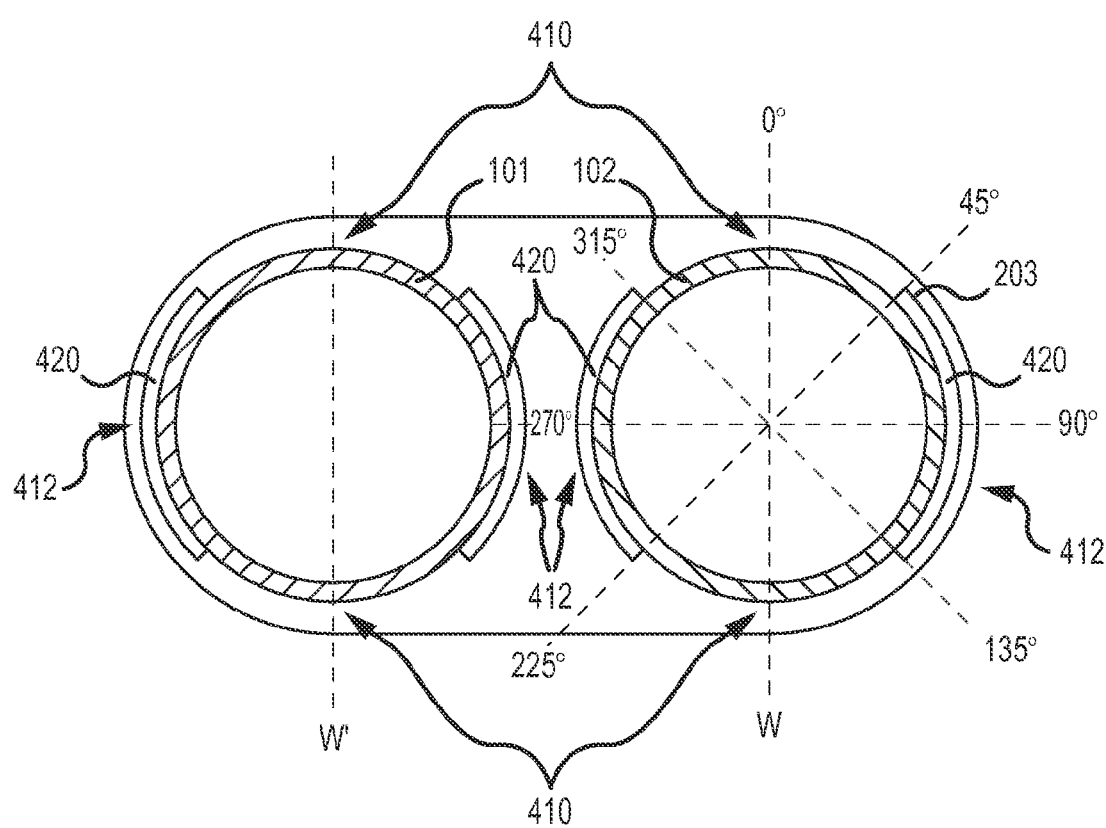
FIG. 6 shows a partially bonded brace bar according to another embodiment of the invention.

FIG. 6 shows a cross section view of the flow tubes 101, 102 looking straight down on the brace bar 203 according to another embodiment of the invention. FIG. 6 is similar to FIG. 5, with the exception of the bonds 420. Rather than providing bonds 420 only in a portion of the high stress region 412 as in FIG. 5, the bonds 420 of FIG. 6 extend through the entire high stress region 412. It may be advantageous in certain embodiments to provide bonding through the entire high stress region 412 as shown in FIG. 6. It should also be appreciated that other bonding configurations are contemplated, which provide a partial bond in the high stress region 412. For example, multiple discontinuous bonds 420 may be provided in the high stress region 412.

Figure 7:
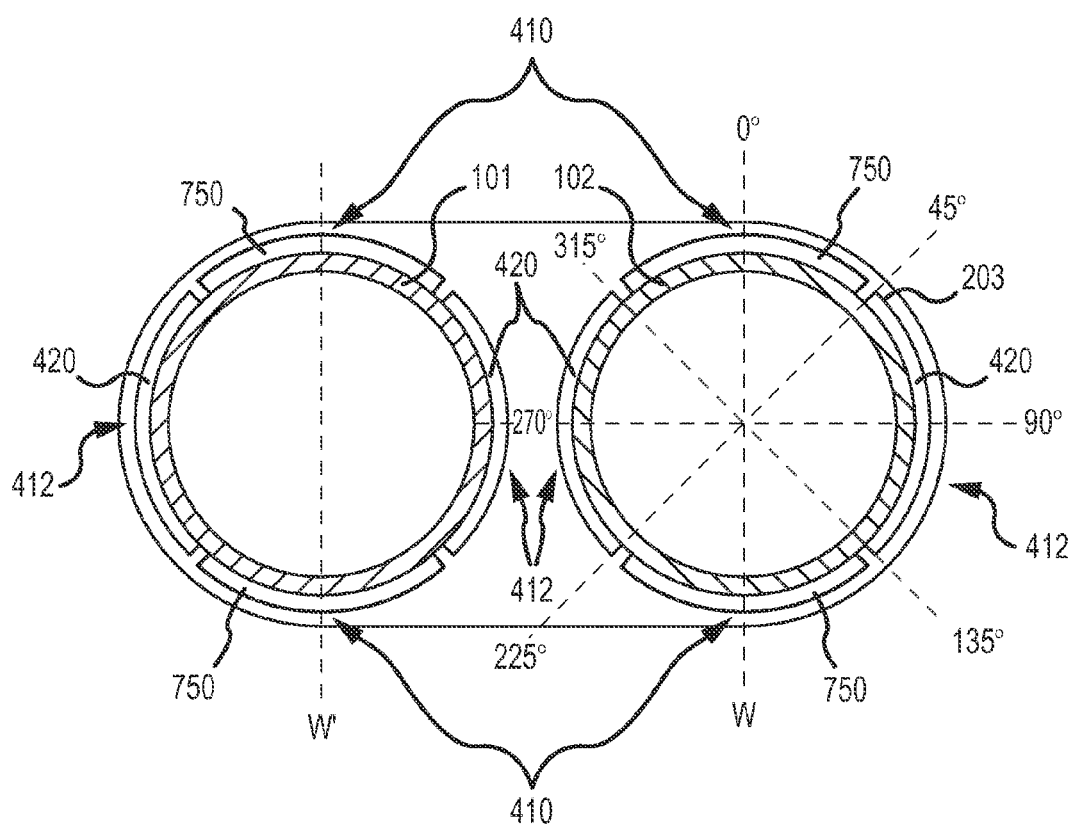
FIG. 7 shows a partially bonded brace bar according to another embodiment of the invention.

FIG. 7 shows a cross section view of the flow tubes 101, 102 looking straight down on the brace bar 203 according to yet another embodiment of the invention. The brace bar 203 shown in FIG. 7 is similar to that shown in FIGS. 6 & 7 except that the brace bar 203 shown in FIG. 7 includes a cut-out region 750. One condition that can cause problems during vibration is the dampening of vibration caused by the elements rubbing together. Because the brace bar 203 is only bonded to the vibrating element in the high stress region 412, there is a potential of unwanted rubbing of the un-bonded portion of the brace bar 203 to the vibrating element. This unwanted rubbing could potentially cause unwanted dampening. In order to avoid unwanted dampening caused by the rubbing of un-bonded portions of the brace bars 201-204, the brace bars 201-204 may in some embodiments include a relief or cut-out region 750. The cut-out region 750 is formed in the brace bar 201-204 in the portion of the brace bar 201-204 that is aligned with the low stress region 410 of the flow tubes 101, 102. Therefore, the cut-out region 750 does not affect the bond 420, which is located in the high stress region 412.

Although the cut-out region 750 extends through substantially the entire low stress region 410, it should be understood that in other embodiments, the cut-out region 750 may only extend through a portion of the low stress region 410.

While the above discussion has been directed towards the bonding of a brace bar to a flow tube, it should be understood that the partial bonding described is equally applicable to other applications that experience both high stress regions and low stress regions. The present invention is particularly appropriate for elements that are consistently under vibrations about a neutral axis where the low stress areas and high stress areas can be predicted with a relatively high probability.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other vibrating elements, and not just to the embodiments described above and shown in the accompanying figures. Accordingly, the scope of the invention should be determined from the following claims.

I claim:
1. A partially bonded brace bar assembly, comprising:
a vibrating element adapted to be vibrated about a bending axis (W, W') and having a high stress region (412); and
a brace bar (201-204) bonded to the vibrating element with a partial bond (420) formed only in the high stress region (412).

2. The partially bonded brace bar assembly of claim 1, wherein the partial bond extends over the entire high stress region (412).

3. The partially bonded brace bar assembly of claim 1, wherein the partial bond (420) is located on only a top side (440) of the brace bar (201-204).

4. The partially bonded brace bar assembly of claim 1, wherein the partial bond (420) is located on only a bottom side (450) of the brace bar (201-204).

5. The partially bonded brace bar assembly of claim 1, wherein the partial bond (420) is located on both a top side (440) and a bottom side (450) of the brace bar (201-204).

6. The partially bonded brace bar assembly of claim 1, wherein the vibrating element comprises a flow tube (101, 102).

7. The partially bonded brace bar assembly of claim 1, wherein the brace bar (201-204) further comprises a cut-out region (750) formed in a portion of the brace bar (201-204) aligned with a low stress region (410) of the vibrating element.

8. A method for partially bonding a brace bar to a vibrating element adapted to be vibrated about a bending axis and having a high stress region, the method comprising steps of:
positioning the vibrating element within the brace bar; and
bonding the brace bar to the vibrating element using a partial bond formed only in the high stress region.

9. The method of claim 8, further comprising a step of forming the partial bond through the entire high stress region.

10. The method of claim 8, further comprising a step of partially bonding only a top side of the brace bar.

11. The method of claim 8, comprising a step of partially bonding only a bottom side of the brace bar.

12. The method of claim 8, further comprising a step of partially bonding both a top side and a bottom side of the brace bar.

13. The method of claim 8, wherein the vibrating element comprises a flow to tube.

14. The method of claim 8, further comprising a step of forming a cut-out region in a portion of the brace bar that is aligned with a low stress region of the vibrating element.

\* \* \* \* \*

UNITED STATES PATENT AND TRADEMARK OFFICE
CERTIFICATE OF CORRECTION

PATENT NO. : 8,281,668 B2
APPLICATION NO. : 12/934091
DATED : October 9, 2012
INVENTOR(S) : Allen Honegger It is certified that error appears in the above-identified patent and that said Letters Patent is hereby corrected as shown below:

Column 8, Line 11, add --further-- before the word comprising

Column 8, Line 17, delete "to"

Signed and Sealed this
Nineteenth Day of March, 2013

Teresa Stanek Rea
*Acting Director of the United States Patent and Trademark Office*